V. E. GEE.
SHOCK ABSORBER.
APPLICATION FILED MAY 5, 1917.

1,254,400.

Patented Jan. 22, 1918.

WITNESSES
James F. Crown
S. M. McColl

INVENTOR
Verdy E. Gee,
BY Richard B. Owen,
ATTORNEY

UNITED STATES PATENT OFFICE.

VERDY E. GEE, OF LEMOORE, CALIFORNIA.

SHOCK-ABSORBER.

1,254,400.

Specification of Letters Patent.

Patented Jan. 22, 1918.

Application filed May 5, 1917. Serial No. 166,646.

*To all whom it may concern:*

Be it known that I, VERDY E. GEE, a citizen of the United States, residing at Lemoore, in the county of Kings and State of California, have invented certain new and useful Improvements in Shock-Absorbers, of which the following is a specification.

This invention relates to vehicles, and more particularly to shock absorbers therefor.

The main object of the invention is to provide a simply constructed, cheap and efficient device of this character which may be readily and quickly applied or removed.

Another object is to provide an absorber of this character having frictionally engaged sliding clutch faces and which is arranged between the springs of the vehicle and its body and operates to absorb shocks imparted to the springs and prevent them from being conveyed to the body.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
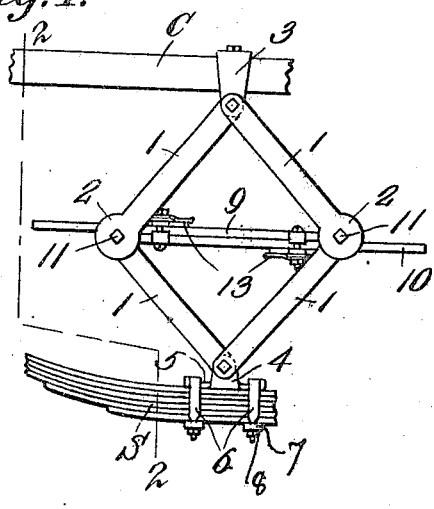
Figure 2:
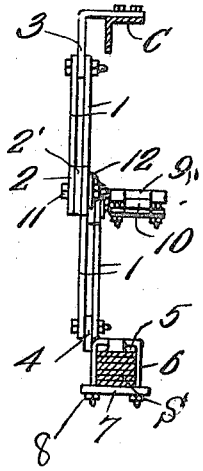
Figure 3:
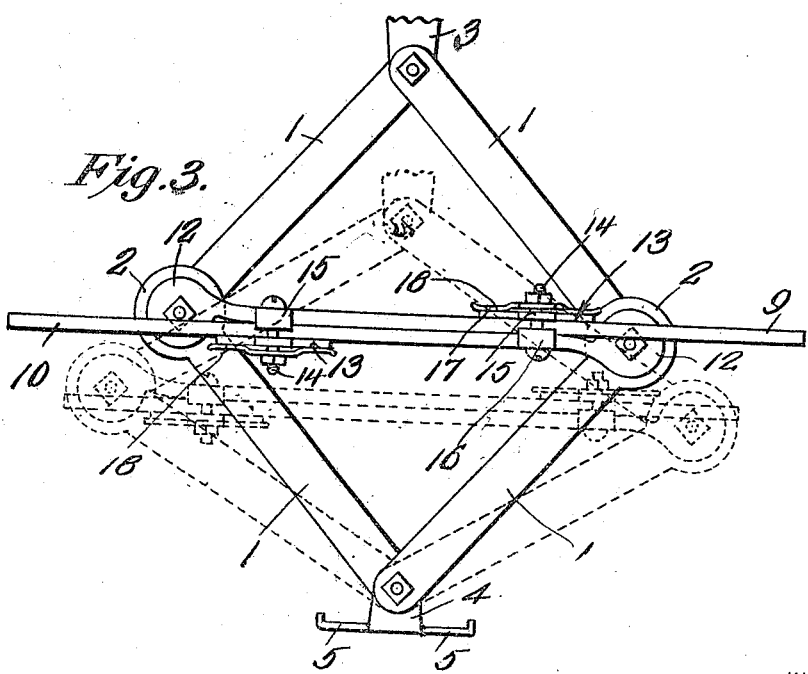

In the accompanying drawings:

Figure 1 represents a side elevation showing this improved shock absorber applied to the springs and chassis of a vehicle, portions of which only are illustrated, Fig. 2 is a vertical section taken on the line 2—2 of Fig. 1, and Fig. 3 is an enlarged side elevation of the shock absorber detached and shown in expanded position in full lines and in collapsed position in dotted lines.

In the embodiment illustrated, the shock absorber constituting this invention comprises four steel links 1, all of which are exactly alike and of the same length and are pivotally connected at their ends to form an expansible and collapsible frame designed to be disposed between the springs S of the vehicle to which the absorber is to be applied and the chassis C as shown in Fig. 1. These links 1 are each provided at one end with a circular head 2, which heads have thickened portions or enlargements 2' on the face thereof, said heads being arranged in lapping engagement with the enlargements engaging each other so as to place the links to position them in different planes and provide for their movement freely relative to each other without contacting.

The other ends of the links 1 lap and are pivotally connected, having an attaching clip 4 and a hanger 3 arranged between said lapping ends, the hanger 3 being secured to the chassis C and clip 4 to the spring S. Clip 4 preferably has longitudinally extending arms 5 adapted to lie on the upper face of spring S (see Fig. 1) and is secured thereto by U-shaped clips 6 which span the spring and are secured by the usual plates 7 and nuts 8.

These connected links form a toggle-like connection between spring S and the vehicle body and the collapse and expansion thereof is controlled by two friction slides in the form of bars 9 and 10 which are secured to the bolts 11 which connect the headed ends of the links 1. These bars 9 and 10 have one end offset laterally inward, one terminal of which is flattened as shown at 12, said terminal being apertured for the passage therethrough of the bolts 11 which securely clamp the bars in engagement with the outer faces of the heads of the adjacent links.

These bars 9 and 10 may be of any desired width and are preferably of a length greater than the distance between the headed ends of the links when in their extreme collapsed position so as to prevent all possibility of said bars becoming disengaged, should these links ever assume such position, which is not probable. These bars are held in contacting relation by means of clamps here shown in the form of strips 13, one of which is designed to overlie the upper face of bar 9 and the other is disposed on the lower face of bar 10 and form additional friction faces for said bars, being held in engagement therewith by means of bolts 14 which pass through apertured ears 15 formed on the side edges of the respective bars adjacent their connected ends and through similar ears 16 which project laterally from the clamps 13. These auxiliary friction devices shown in the form of clamps 13 are preferably made in two parts, the inner bar engaging member 17 held in position by a similarly shaped spring plate 18 so that when the member 17 becomes worn it may be readily removed and replaced by another, the plate 17 permitting a slight yielding.

From the above description it will thus be seen that when shocks are received by the springs S the toggle-like links swing on their pivots into collapsed position shown in dotted lines in Fig. 3, the bars 9 and 10 sliding on each other and the auxiliary friction members 13 which operate to absorb all shocks and prevent them from being imparted to the vehicle body. After the shock has been so absorbed and the vehicle assumes normal position, the links will expand into the position shown in full lines in Fig. 3, the bars 9 and 10 sliding outward with their free terminals projecting beyond the frame of the shock absorber.

While very simple and cheap to construct, this device operates to absorb perfectly all shocks received by the vehicle and it will be readily seen that it may be attached or disconnected in a very few minutes by simply disengaging the hanger 3 from the chassis C and the clamps 6 from the spring S, so that they may be repaired or new ones put in their places if found necessary.

While this shock absorber is shown mounted with the slits positioned on the inner face of the frame thereof, it is to be understood that this position may be reversed if found necessary or desirable and the slits arranged on the outer face so as to position them out of the way of the springs, should sufficient load be placed on the vehicle to bring said springs into contacting relation such as might interfere with the operation of the slits.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are withing the scope of the claimed invention.

I claim:—

1. A shock absorber comprising four links of substantially the same length pivotally connected at their ends to form a substantially rectangular toggle-like frame, a pair of friction bars each secured at one end to said frame at diametrically opposite points, means for securing said bars with their faces in frictional engagement, auxiliary friction members carried by said bars, and means for connecting said frame with the chassis and springs of a vehicle at points at right angles to the points at which said bars are connected.

2. A shock absorber comprising four links of corresponding size and shape, each of which has an enlarged circular head at one end with an enlargement on one face of said head, bolts pivotally connecting the headed ends of said links in pairs, bolts pivotally connecting the other ends of said pairs of links to form a substantially rectangular toggle-like frame, friction bars having their faces arranged in sliding relation and one end thereof offset laterally and apertured to receive the bolts which connect the headed ends of the links, means for holding and conducting said bars in their sliding engagement, and auxiliary friction means carried by said holding means.

3. A shock absorber comprising four links of corresponding size and shape, each of which has an enlarged circular head at one end with an enlargement on one face of said head, bolts pivotally connecting the headed ends of said links in pairs, bolts pivotally connecting the other ends of said pairs of links to form a substantially rectangular toggle-like frame, friction bars having their faces arranged in sliding relation and one end thereof offset laterally and apertured to receive the bolts which connect the headed ends of the links, means for holding and conducting said bars in their sliding engagement, and auxiliary friction means carried by said holding means, said auxiliary means comprising a plurality of strips arranged on the outer faces of said bars adjacent the free ends thereof.

In testimony whereof I affix my signature in presence of two witnesses.

VERDY E. GEE.

Witnesses:
 JAMES J. HIGHT,
 B. E. SCHUEREGER.